(12) United States Patent
Orr et al.

(10) Patent No.: US 7,787,545 B2
(45) Date of Patent: *Aug. 31, 2010

(54) MULTI-CHANNEL WAVELET CODEC (75) Inventors: David Orr, Vancouver, WA (US); Mark M Westerman, Longiven, TX (US)

(73) Assignee: XtendWave, Inc., Dallas, TX (US)

(*) Notice: Subject to any disclaimer, the term of this patent is extended or adjusted under 35 U.S.C. 154(b) by 795 days.

This patent is subject to a terminal disclaimer.

(21) Appl. No.: 10/756,197

(22) Filed: Jan. 12, 2004

(65) Prior Publication Data

US 2005/0152464 A1    Jul. 14, 2005

(51) Int. Cl.
*H04K 1/10* (2006.01)
*H04L 27/28* (2006.01)

(52) U.S. Cl. ........................ 375/260; 708/300

(58) Field of Classification Search ............ 375/232, 375/260, 259, 240.24, 240.11, 240.02; 708/322, 708/313, 300, 400, 401; 382/232, 233, 237, 382/240
See application file for complete search history.

(56) References Cited

U.S. PATENT DOCUMENTS

| | | | | |
|---|---|---|---|---|
| 5,128,964 | A * | 7/1992 | Mallory | 375/261 |
| 5,453,945 | A * | 9/1995 | Tucker et al. | 708/400 |
| 5,926,791 | A * | 7/1999 | Ogata et al. | 704/500 |
| 5,995,539 | A * | 11/1999 | Miller | 375/222 |
| 6,332,043 | B1 * | 12/2001 | Ogata | 382/240 |
| 6,499,045 | B1 * | 12/2002 | Turney et al. | 708/401 |
| 6,553,396 | B1 * | 4/2003 | Fukuhara et al. | 708/313 |
| 6,581,081 | B1 * | 6/2003 | Messerly et al. | 708/322 |
| 6,678,419 | B1 * | 1/2004 | Malvar | 382/240 |
| 6,909,808 | B2 * | 6/2005 | Stanek | 382/232 |
| 6,961,742 | B2 | 11/2005 | Neretti et al. | 708/300 |
| 7,039,665 | B2 * | 5/2006 | Zelazo et al. | 708/300 |
| 7,058,676 | B2 * | 6/2006 | Majani | 708/322 |
| 7,164,724 | B2 * | 1/2007 | Koga et al. | 375/260 |
| 2002/0078112 | A1 * | 6/2002 | Majani | 708/300 |
| 2003/0118241 | A1 * | 6/2003 | Zandi et al. | 382/240 |

(Continued)

OTHER PUBLICATIONS

C. Van Bouwel, J.Potemans, S.Schepers, B.Nauwelaers, A.Van de Capelle, "Wavelet Packet based Multicarrier Modulation", ESAT-TELEMIC, Leuven, 2000 IEEE.*

(Continued)

*Primary Examiner*—Chieh M Fan
*Assistant Examiner*—Aristocratis Fotakis
(74) *Attorney, Agent, or Firm*—Merchant & Gould P.C.

(57) ABSTRACT

Wavelet filters computed from a wavelet transform are used as a means of pulse shaping binary data transmitted and received over multiple parallel channels. At the transmitter the data is parsed from a serial bit stream to several parallel streams. Within each of the parallel bit streams symbols are formed. Signals are created from each symbol by up-sampling by inserting zeros between successive symbols. These signals are passed through a bank of low-pass and high-pass filters derived from a wavelet packet transform. The filters are paired: one high-pass with a low-pass. The ordering is alternated to preserve "natural" frequency ordering. These steps are repeated for this set of signals until only one signal remains. The remaining signal is transmitted in the base band of the transmission system or they are transmitted by modulating the carrier of the transmission system. At the receiver the steps are reversed to recover symbols.

13 Claims, 3 Drawing Sheets

U.S. PATENT DOCUMENTS

2003/0231714 A1* 12/2003 Kjeldsen et al. ............. 375/259
2004/0064492 A1* 4/2004 Zelazo et al. ............... 708/300
2004/0184400 A1* 9/2004 Koga et al. .................. 370/208

OTHER PUBLICATIONS

Mohan Vishwanath, "The Recursive Pyramid Algorithm for the Discrete Wavelet Transform", 1994 IEEE.*

Helmut Bolcskei, Pierre Duhamel and Rima Hleiss, "Orthogonalization of OFDM/OQAM Pulse Shaping Filters Using the Discrete Zak Transform", Feb. 2003.*

Alan R. Lindsey, "Generalized Orthogionally Multiplexed Communication via Wavelet Packet Bases", PHD thesis, Ohio University, Jun. 1995.*

Do, Anh Hong, Office Action Summary, Dec. 28, 2006, U.S. Appl. No. 10/876,269.

* cited by examiner

MULTI-CHANNEL WAVELET CODEC

FIELD OF THE INVENTION

The present invention relates to methods for encoding and modulating signals, specifically a system and method for the use of wavelet transforms to encode a signal to achieve maximum transmission speed and distance. The encoded signal may be transmitted in the base-band or may be modulated and de-modulated in a multiple-carrier transmission system.

BACKGROUND

The demand for provision of multi-media and other bandwidth services over telecommunications networks has created a need to transmit high bit rate traffic over copper pairs. This requirement has led to the development of a number of different transmission schemes, such as, ADSL and VDSL. One of the more likely modulation systems for all these transmission schemes is a line code known as DMT (discrete multi-tone), which bears some resemblance to orthogonal frequency division multiplex, and is a spread spectrum transmission technique.

In discrete multi-tone transmission, the available bandwidth is divided into a plurality of sub-channels each with a small bandwidth, 4 kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Discrete multi-tone transmission (DMT), is disclosed in U.S. Pat. No. 5,479,447 issued December 1995 and in an article entitled "Performance Evaluation of a Fast Computation Algorithm for the DMT in High-Speed Subscriber Loop", IEEE Journal on Selected Areas in Communications, Vol. 13, No. 9, December 1995 by I. Lee et al. Specifically, U.S. Pat. No. 5,479,447 discloses a method and apparatus for adaptive, variable bandwidth, high-speed data transmission of a multi-carrier signal over a digital subscriber loop. The data to be transmitted is divided into multiple data streams which are used to modulate multiple carriers. These modulated carriers are converted to a single high speed signal by means of IFFT (Inverse Fast Fourier Transform) before transmission. At the receiver, Fast Fourier Transform (FFT) is used to split the received signal into modulated carriers which are demodulated to obtain the original multiple data streams.

A DMT system is not entirely satisfactory for use in two-wire subscriber loops, which are very susceptible to noise and other sources of degradation which could result in one or more sub-channels being lost. If only one sub-channel fails, perhaps because of transmission path noise, the total signal is corrupted and either lost or, if error detection is employed, may be retransmitted. It has been proposed to remedy this problem by adaptively eliminating noisy sub-channels, but to do so would involve very complex circuitry.

SUMMARY

The present invention comprises an apparatus and method of for using wavelet filters computed from a wavelet transform as a means of encoding, transmitting, receiving and decoding information on multiple parallel channels. The method of encoding and decoding has been found to achieve very high transmission rates over great distances. At the transmitter, (1) the data is parsed from a serial bit stream to several parallel streams; the number of bits per symbol need not remain, constant; and there are many means of setting this level in the field of information theory (the most prevalent would be a "water filling" approach). (2) Within each of the parallel bit streams symbols are formed from the bits and consist of the set $\{0, 1, \ldots 2^k -1\}$ where k is the number of bits per symbol. The symbols are normally Grey coded to decrease the probability of a bit error, which is a common practice in communications systems engineering, however other forms of pre-coding can be used. (3) [a] Signals are created from each symbol by first, up-sampling by inserting zeros between successive symbols (this defines a signal-no longer just an abstraction of the information. [b] These signals are passed through a bank of low-pass and high-pass filters that are derived from a wavelet packet transform (the wavelet and scaling functions, or, equivalently the low-pass and high-pass reconstruction filters). [c] The filters are paired: one high-pass with a low-pass. The ordering is alternated to preserve "natural" frequency ordering. (4) The steps 3[a], 3[b] and 3[c] are recursively repeated $\log_2 N$ times for a signal of length N. The resulting signal is transmitted either in the base band or is transmitted by modulating the carrier of the transmission system. At the receiver, Steps 1 through 3 are reversed to recover symbols, with the up-sampled signal down-sampled to remove inserted zeroes. Symbol decisions are made through any one of a number of methods, which increase the probability of a correct decision.

BRIEF DESCRIPTION OF DRAWINGS AND TABLES CONTAINING EXECUTABLE COMPUTER PROGRAMS

Table 1 contains MatLab code to covert binary data to Grey code.

Table 2 contains MatLab code to return wavelet factors for constructing and deconstructing data using various wavelet filters.

Table 3 contains MatLab code to encode a data stream using wavelet filters.

Table 4 contains MatLab code to decode an encoded data stream.

Table 5 contains the MatLab script used to test the invention.

DETAILED DESCRIPTION

A system and method is disclosed for encoding a binary data stream, transmitting the stream in the base band or the encoded signal is transmitted by using the encoded stream to modulate a plurality of single carriers, which is de-modulated and decoded at the receiver.

Figure 1:
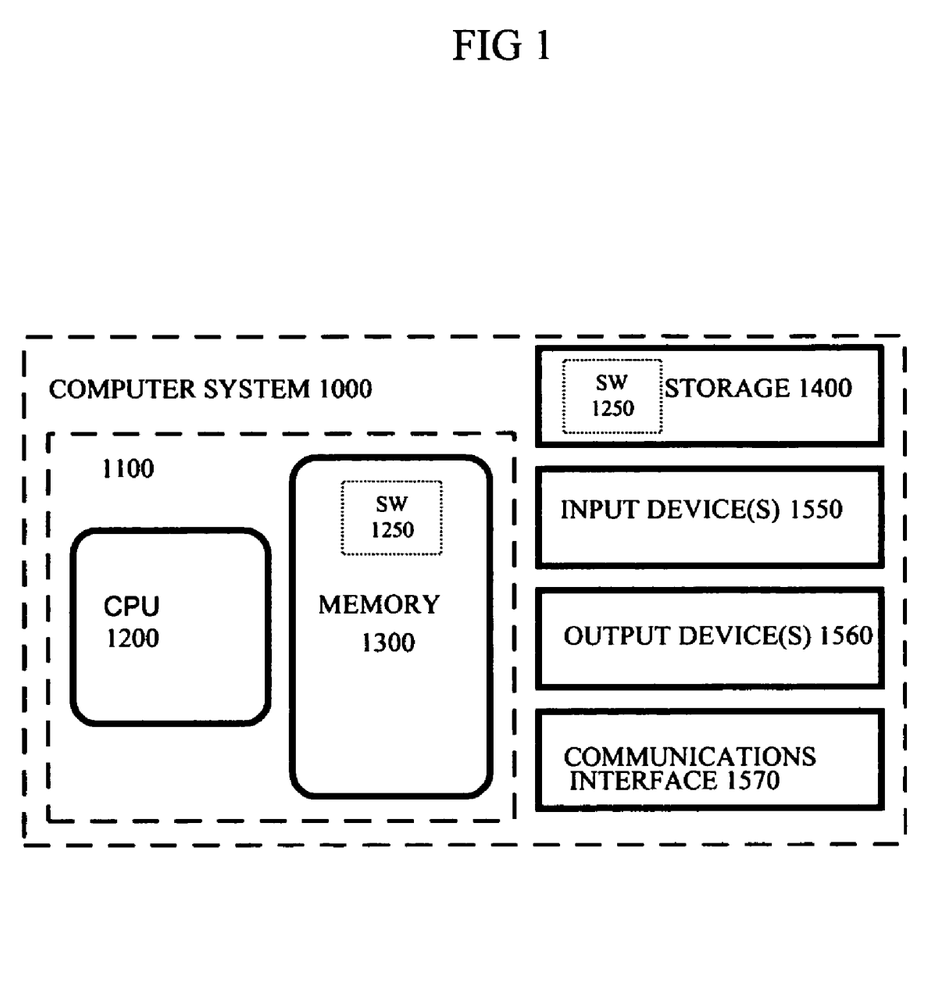
FIG. 1 shows an exemplary computing environment for the invention.

FIG. 1 illustrates a generalized example of a suitable computing environment 1000 in which an exemplary embodiment of the invention may be implemented. The computing environment shown in FIG. 1 is not intended to suggest any limitation as to scope of use or functionality of the invention, as the present invention may be implemented in diverse general-purpose or special-purpose computing environments.

With reference to FIG. 1, the computing environment 1000 of the apparatus and method of the invention includes at least one processing unit 1200 and memory 1300. It will be understood that the computing environment may be implemented within a communications system to control a transmitter and receiver, and is implemented in any one of several forms: (a) discrete hardware and software systems; (b) ASICs (application specific integrated circuits, and (c) FPGA (field-programmable gate array.

In FIG. 1, this most basic configuration 1000 is included within 1100 a dashed line. The processing unit 1200 executes computer-executable instructions and may be a real or a virtual processor. In a multi-processing system, multiple processing units execute computer-executable instructions to increase processing power. The memory 1300 may be volatile memory (e.g., registers, cache, RAM), non-volatile memory (e.g., ROM, EEPROM, flash memory, etc.), or some combination of the two. The memory 1300 stores executable software—instructions and data 1250—written and operative to execute and implement the software applications required to support the interactive environment of the invention.

The computing environment may have additional features. For example, the computing environment 1000 includes storage 1400, one or more input devices 1550, one or more output devices 1560, and one or more communication connections or interfaces 1570. An interconnection mechanism (not shown) such as a bus, controller, or network interconnects the components of the computing environment. Typically, operating system software (not shown) provides an operating environment for other software executing in the computing environment, and coordinates activities of the components of the computing environment.

The storage 1400 may be removable or non-removable, and includes magnetic disks, magnetic tapes or cassettes, CD-ROMs, DVDs, or any other medium which can be used to store information and which can be accessed within the computing environment. The storage 1400 also stores instructions for the software 1250, and is configured to store data collected and generated during at least one interactive session.

The input device(s) 1550 may be a touch input device such as a keyboard, mouse, pen, or trackball, a voice input device, a scanning device, or another device that provides input to the computing environment. For audio or video, the input device(s) may be a sound card, video card, TV tuner card, or similar device that accepts audio or video input in analog or digital form. The output device(s) 1560 may be a display, printer, speaker, or another device that provides output from the computing environment.

The communication interface 1570 enable the apparatus and software means to control communication over a communication medium (not shown) with another similar system, for example, the system implements a transmitter that exchange messages with a similarly configured receiver. The communication medium conveys information such as voice signals, video, and data in a modulated data signal. A modulated data signal is a signal that has one or more of its characteristics set or changed in such a manner as to encode information in the signal. By way of example, and not limitation, the communication media include wired or wireless techniques implemented with an electrical, optical, RF, infrared, acoustic, or other carrier.

A Method of Encoding and Decoding a Signal by Filters for Modulation and Demodulation A method and system for encoding and transmitting a signal comprises: (1) generating a recursive wavelet decomposition using analysis wavelet low-pass and high-pass filters selected from the set comprising D-Meyer, Coiflet and Symlet filters; (2) re-ordering the decomposition so that frequency order is maintained; (3) assigning values of an input signal to filters generated by the decomposition; (4) modulating each selected filter by the assigned value, (5) combining the modulated filters, and (5) transmitting the combined filters in baseband or using the combined modulated filters to modulate a carrier.

A method and system for decoding a signal encoded and transmitted by the method above comprises: (1) generating a recursive wavelet decomposition using synthesis wavelet low-pass and high-pass filters selected from the set comprising D-Meyer, Coiflet and Symlet filters; (2) re-ordering the decomposition so that frequency order is maintained; (3) using the synthesis filters from the decomposition as matched filters for the received signal; and (4) deriving the input signal assigned value from the filter matching. It will be appreciated that the analysis filters generated by the transmitter and the synthesis filters generated by the receiver are of the same type of wavelet.

The method and technique described below and summarized above has been found to provide an optimum method of pulse shaping of binary data for transmission over noisy channels.

An exemplary signal encoding process using the invention is described with respect to FIG. 2 and also with reference to MatLab programming statements shown in Table 1-5, below.

With reference Table 1, the binary data stream is converted to Grey code by calling the function "bi2Grey" with the binary data assembled as a binary vector and passed as an argument. A Grey code is a special coding system designed to reduce undetected errors resulting from random perturbations of transmitted binary data. The function "bi2Grey" returns a binary vector with the data passed as an argument returned as a Grey coded binary vector. While a Grey coding has been used in the exemplary embodiment, the exemplary embodiment does not require Grey coding; other coding schemes to reduce transmission errors can be used.

With reference to Table 2, the function "wfactors" is called to return factors used in the processes of encoding and decoding a signal using wavelet filter banks. "wfactors" returns (a) "delay", the beginning index used to down-sample an input signal that is encoded using wavelet filters and (b) the system delay in samples; wherein the input signal is encoded and decoded according to the name of the wavelet, "wname", passed as an argument to "wfactors."

Table 2 shows delay factors used in an exemplary embodiment of the invention for the wavelet filters: (a) discrete Meyer; (b) Symlet 16; (c) Symlet 2; (d) Symlet 3; (e) Symlet 4; (f) Symlet 5; (g) Coiflet 2; and (h) Coiflet 3.

Figure 2:
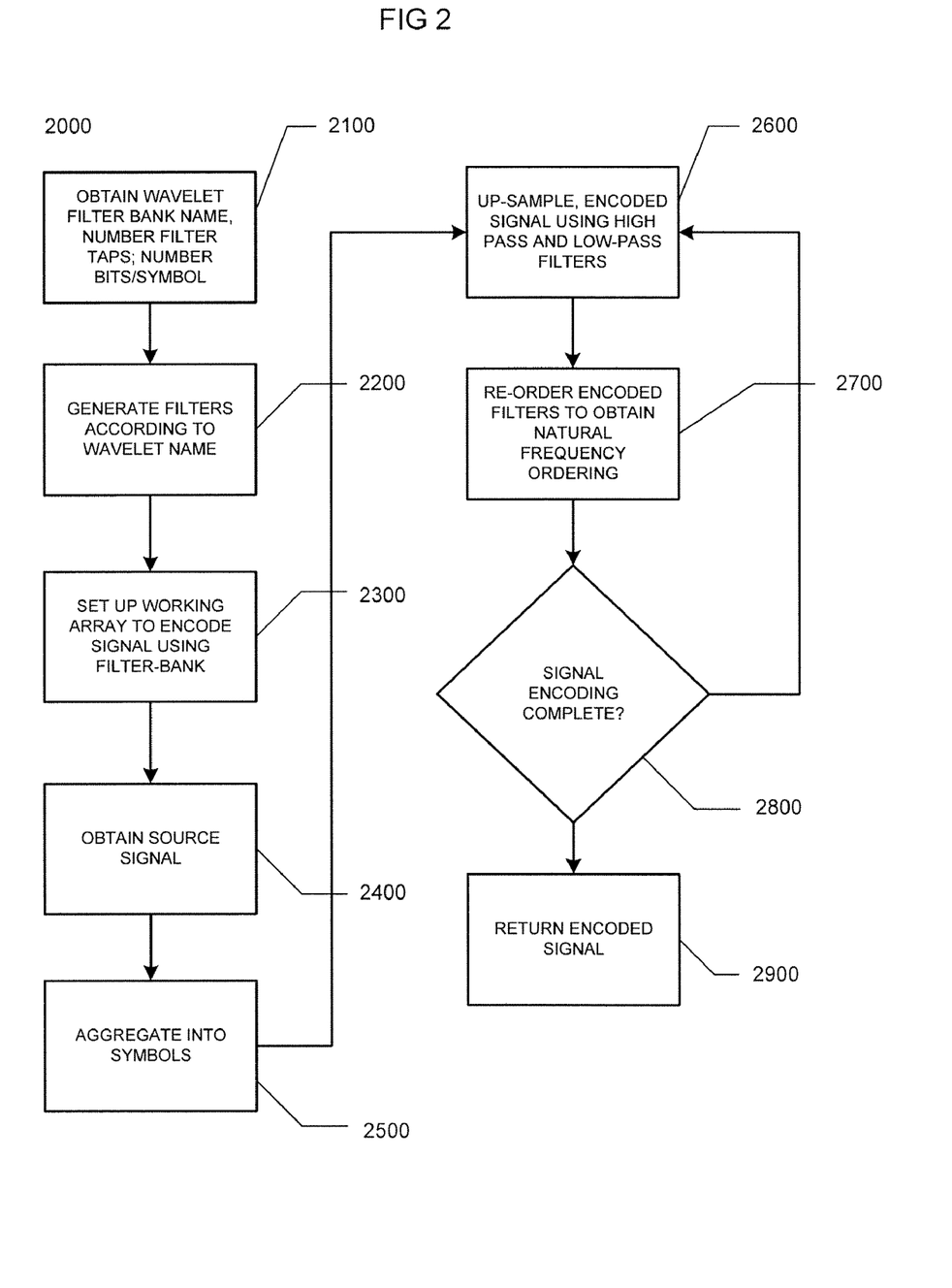
FIG. 2 is a flow diagram of an exemplary method and process used by a transmitter equipped with the invention.

See FIG. 2, 2000, a flow diagram of the transmitter encoding process, and Table 3, which contains exemplary MatLab programming statements implementing the process used by the transmitter. The MatLab function "WPconstruct" is called to construct a signal using wavelet filters; "WPconstruct" is passed arguments related to the number of samples, or filter taps, related to filters used ("Nmaster"), and the name of the wavelet filter ("wname") to use in encoding a binary signal. In FIG. 2, 2100, the name of the wavelet filter bank used for signal encoding and the number of filter taps are obtained. In Table 3, In lines 13 and 14, the MatLab function "wfilters" is called to return the low-pass and the high-pass filter corresponding to "wname." In FIG. 2, 2200, the low-pass and high-pass filters corresponding to "wname" are generated.

In FIG. 2, 2300 and Table 3 lines 16-20 a working array is set up to encode a signal. With reference to FIG. 2, 2400, the source signal is obtained. In lines Table 3, lines 23-28, a random source is created for the purpose of test and illustration; in Table 3, the source signal is Grey encoded by calling the MatLab function "bi2Grey" shown in Table 1.

In FIG. 2, 2500, corresponding to Table 3, lines 27-30, the Grey encoded binary data is aggregated into symbols, and the symbols are zero padded.

With reference to FIG. 2, 2600-2700 and Table 3, lines 38-57, symbols are first (a) up sampled; (b) encoded using the low-pass and the high-pass filters given by "wname"; and (c) every other filter is switched to maintain natural frequency ordering in the filter-encoded symbols.

With reference to FIG. 2, 2800, the encoded symbols are recursively encoded according the principles of filter-bank encoding, for example given N symbols, $\log_2 N$ encoding steps are executed. With reference to FIG. 2, 2900, the encoded symbols are returned by "WPconstruct."

The encoded symbols are then transmitted in the base band of a transmission system or the encoded symbols are employed to modulate a plurality of carriers, using available modulation techniques.

TABLE 1

```
1   function g = bi2Grey( b )
2   % BI2GREY converts a binary code to a Grey code. The most
```

TABLE 1-continued

```
1    % significat bit is the left hand side bit.
2    % When the inpt argument is a binary matrix, each row is
3    % converted to the Grey code.
4    %
5    % See also: GREY2BI
6    %
7    % Comments and suggestions to: adrian@ubicom.tudelft.nl
8
9        % copy the msb:
10
11       [r,c] = size(b);
12       g = zeros(r,c+1);
13       %Add a leading zero
14       g(:,1) = 0;%b(:,1)
15       b = [zeros(r,1), b];
16
17       for i =1:c,
18           g(:,i+1) = xor(b(:,i+1),b(:,i) );
19       end
20
21       g = g(:,2:end);
22   return;
```

TABLE 2

```
1    function [delay, DELTA] = wfactors(wavename)
2    % returns the appropriates factors for reconstructing/ decomposing
3    % signals from wavelets at up to the sixth scale through filter banks
4
5    % Mark M. Westerman
6    % WavTech, Inc.
7    % Richardson, TX
8    % 9-13-2002
9
10
11   switch lower(wavename)
12   case 'dmey'
13       DELTA = 61;
14       delay = [1 1 0 0 0 0]; %dmey
15   case 'sym16'
16       DELTA = 31;
17       delay = [1 0 0 0 0 1]; %sym16
18   case 'sym2'
19       DELTA = 3;
20       delay = [1 0 1 1 1 1]; %sym2
21   case 'sym3'
22       DELTA = 9;
23       delay = [1 1 0 1 1 1]; %sym3
24   case 'sym4'
25       DELTA = 3;
26       delay = [1 0 0 1 1 1]; %sym4
27   case 'sym5'
28       DELTA = 9;
29       delay = [1 1 1 0 1 1]; %sym5
30   case 'coif2'
31       DELTA = 11;
32       delay = [1 0 1 0 1 1]; %coif2
33   case 'coif3'
34       DELTA = 17;
35       delay = [1 1 1 1 0 1]; %coif3
36   case 'namez'
37       DELTA = [];
38       delay = [{'dmey'};{'sym16'};{'sym2'};{'sym3'};{'sym4'};{'sym5'};{'coif2'};{'coif3'}];
39   otherwise
40       DELTA = 1;
41       delay = [0 0 0 0 0 0];
42       disp(' ');
43       disp('-----------------CAUTION-----------------------------------')
44       disp('----------------------------------------------------------')
45       disp('wfactors: unknown case, returning general case');
47       disp('delay = [0 0 0 0 0 0]');
48       disp('DELTA = 1');
49       disp('----------------------------------------------------------')
50       disp('----------------------------------------------------------')
51       disp(' ');
```

TABLE 2-continued

```
52
53   end;
```

TABLE 3

```
1    function [sig, syms] = WPconstruct(Nmaster, wname);
2    % WPConstruct -- constructs a psuedo random signal through wavelet packet construction
3    % (accomplished through lifting)
4
5    %-----------------------------------------------------------------
6    %         Wavelet packet lifting - Construction
7    %-----------------------------------------------------------------
8    %-----------------------------------------------------------------
9
10   % Nmaster = 64;
11   % wname = 'coif2';
12
13   [lo_r, lo_d] = wfilters(wname,'l');      % coefficients for low-pass filter
14   [hi_r, hi_d] = wfilters(wname,'h');      % coefficients for high-pass filter
15
16   N = Nmaster;
17   L = 1000;
18   K = 0.75*N-1;
19
20   symz = zeros(L+16,N);                    % create an array of zeros
21
22   %Add greycode functionality
23   symz(1:L,2:K+1) = randsrc(L,K,[1:16]);   % creates a matrix representing a random source
24   %
25   %
26   %
27   map = [0; bi2de((bi2Grey(de2bi((0:15)','left-msb')),'left-msb')*2–15];
28   syms = map(symz+1);
26
27   %4 bits per *channel* per symbol
28   % syms(1:L,IND) = randsrc(L,K,[1]);
29
30   %Pad with some zeros to flush the filters
31   L = L+16;
32
33   sig = syms;
34   % plot(sig)
35   % pause(3)
36
37   %Now construct the signal
38   for j = 1:log2(N)
39       N = N/2;
40       L = L*2;
41       old_sig = sig;
42       sig = zeros(L,N);
43
44       ind = 1;
45       for k=0:2:2*N-1
46
47           %To maintain natural frequency ordering, we must switch every other pair
48           %of HP/LP filters
49           k1 = mod(ind+1,2)+1;
50           k2 = mod(ind,2)+1;
51
52           sig(:,ind) = filter(lo_r,1,upsample(old_sig(:,k+k1)))' + ...
53                 filter(hi_r,1,upsample(old_sig(:,k+k2)))';
54
55           ind = ind+1;
56       end;
57   end;
58
60   syms = symz;
```

Figure 3:
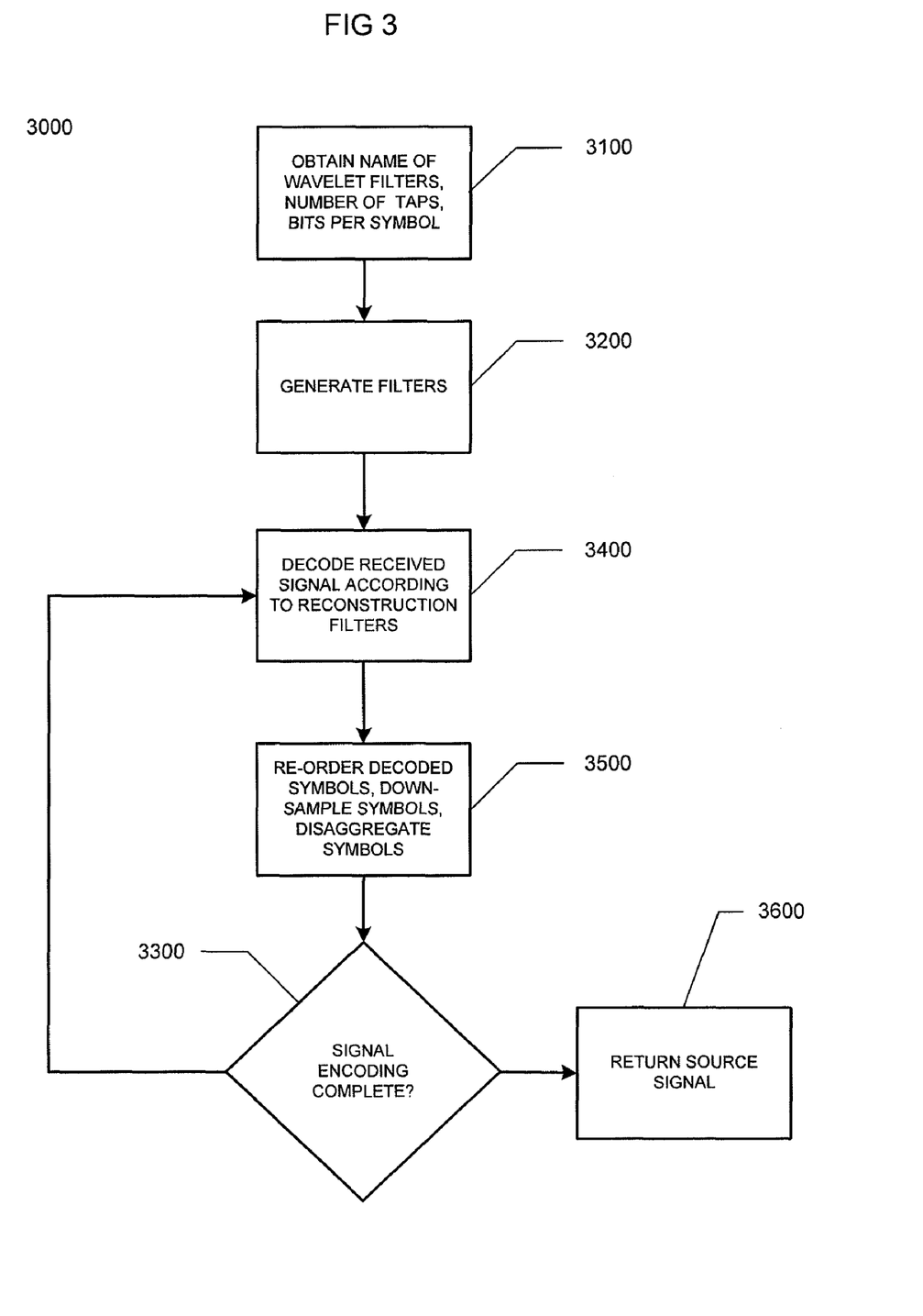
FIG. 3 is a flow diagram of an exemplary method and process used by a receiver equipped with the invention.

With reference to FIG. 3, the receiver employs a corresponding exemplary process to decode received symbols. The exemplary process is further shown by a coding example using MatLab in Table 4 that follows. Table 4 illustrates coding used to decompose the symbols of the received signal and to convert the symbols back into the original binary stream processed by the transmitter.

TABLE 4

```
1    function [dec, DELTA] = WPdecompose(sig, Nmaster,
     wname);
2    %WPdecompose -- decomposes a specially made sequence from
3                    WPconstruct
4    %--------------------------------------------------------------
5    %              Wavelet packet lifting -- Deconstruction
6    %--------------------------------------------------------------
7    %--------------------------------------------------------------
8
9    %delay determines the beginning index of downsampling
10   %DELTA is the delay (in samples) of the system
11   [delay, DELTA] =         % obtain delay for wavelet used
     wfactors(wname);
12
13   N = Nmaster;
14   [lo_r, lo_d] = wfilters(wname,'l');
15   [hi_r, hi_d] = wfilters(wname,'h');
16
17   Nprime = 1;
18   L = length(sig);
19
20   dec = sig;
21   swap = 1;
22
23   while Nprime < N
24       Nprime = 2*Nprime;
25       L = L/2;
26       old_dec = dec;
27       dec = zeros(L,Nprime);
28       ind = 1;
29
30       for k = 1:2:(Nprime)
31
32           tl = filter(lo_d,1,old_dec(:,ind));
33           th = filter(hi_d,1,old_dec(:,ind));
34
35           %Once again, we must swap the LP/HP sections
36           k1 = mod(ind+1,2);
37           k2 = mod(ind,2);
38
39           dec(:,k + k1) = tl(1+delay(swap):2:end);
40           dec(:,k + k2) = th(1+delay(swap):2:end);
41           ind = ind+1;
42       end;
43       swap = swap+1;
44       %  keyboard
45   end;
```

With reference to FIG. 3, a flow diagram 3000 of the receiver decoding process is shown. With reference to the MatLab programming statements in Table 4, the receiver decoding logic "WPdecompose" is called when the receiver acquires a signal. With reference to Table 4, line 1, "WPdecompose" is called by passing arguments: (1) the signal acquired; (2) the number of filter taps used for encoding filters; and (3) type of wavelet filter used to encode the signal.

With reference to FIG. 3, 3100-3200 and Table 3, lines 14-15, decoding or reconstruction filters are derived or obtained—the decoding filters generated according to the requirements of quadrature mirror filter perfect reconstruction.

With reference to FIG. 3, 3400,-3500 and Table 3, lines 30-45, the encoded symbols are decoded using the reconstruction filters. At each iteration of the reconstruction, filter coefficients that were swapped in order to achieve natural frequency ordering are swapped again so that the coefficients will be in proper order for reconstruction of the signal encoded by the transmitter. Zeroes inserted by the transmitter up-sampling are removed by down-sampling the signal during each iteration of the decoding.

With reference to FIG. 3, 3300, the reconstruction is recursively executed until the original encoded symbols are decoded. The reconstructed or decoded signal is returned from the receiver 3600.

A MatLab Script Demonstrating the Combined Use of the MatLab Programming Examples With reference to Table 5 a MatLab script is shown that uses the MatLab functions shown in previous tables. The script calls the MatLab functions used by the transmitter and the receiver to encode, and decode a signal. The script simulates modulation and signal corruption.

TABLE 5

```
%A script for evaluating the performance of the OFDM/DMT wavelet
varient
Nmaster = 16;
wname = 'coif2';
[sig,syms] = WPconstruct(Nmaster,wname);
n = 0.75*Nmaster – 1;
SNR = 25;
noise_lev= 10^(-SNR/10)*var(sig);
sym_errs = 0;
bit_errs = 0;
num_bits = 0;
while bit_errs<20
    noise = noise_lev*randn(size(sig));
    [dec, DELTA] = WPdecompose(sig + noise, Nmaster, wname);
    map = [0 1 3 2 7 6 4 5 15 14 12 13 8 9 11 10 ]' + 1;
    [INDX,QUANT] = quantiz(dec(DELTA:DELTA+999,[2:n+1]),
    [-14:2:14], map);
    Q = map(reshape(INDX,1000,n)+1);
    errs = symerr(Q,syms(1:1000,2:n+1));
    sym_errs = sym_errs + errs;
    if errs %Only compute BER if there are symbol errors
        biterrs = biterr(Q, syms(1:1000,2:n+1));
    else
        biterrs = 0;
    end;
    num_bits = num_bits + 4000*n;
    bit_errs = bit_errs + biterrs;
    fprintf('(%f, %f, %f)\n',errs, biterrs, bit_errs/num_bits);
end;
```

What is claimed is:

1. A method for encoding, pulse shaping, modulating, and transmitting a signal in a communication system, the method comprising:

selecting, by a transmitter control system, an analysis wavelet filter bank that is adaptive and capable of encoding, pulse shaping, and modulating the signal;

recursively generating, by the transmitter control system, low-pass and high-pass filters according to the analysis wavelet filter bank;

re-ordering the low-pass and high-pass filters according to frequency by the analysis wavelet filter bank, wherein re-ordering the low-pass and high-pass filters includes:

pairing a plurality of high-pass filters and a plurality of low-pass filters to form a plurality of filter bank pairs, wherein the analysis wavelet filter bank is in a stage of recursion;

numbering said plurality of filter bank pairs;

ordering even numbered filter bank pairs such that an even numbered input to each of the even numbered filter bank pairs are filtered with a low-pass filter, and an odd numbered input to each of the even numbered filter bank pairs are filtered with a high-pass filter; and reordering odd numbered filter bank pairs such that an odd numbered input to each of the odd numbered filter bank pairs are filtered with a low-pass filter, and an even numbered input to each of the odd numbered filter bank pairs are filtered with a high-pass filter;

selecting values from the signal with the analysis wavelet filter bank;

using the selected values for modulating the low-pass and high-pass filters; and combining the modulated low-pass and high-pass filters to output an encoded signal.

2. The method of claim 1 further comprising the step of:
transmitting from a transmitter the encoded signal from the combined modulated low-pass and high-pass filters in base-band.

3. The method of claim 1 further comprising the step of:
using the encoded signal from the low-pass and high-pass filters to modulate a carrier for transmitting the encoded signal.

4. The method of claim 1 further comprising the steps of:
aggregating an encoded binary data stream into a plurality of symbols having an unequal number of bits per symbol depending upon a channel quality; and
creating the encoded signal from the plurality of symbols.

5. A method for demodulating, pulse shaping, and decoding a transmitted signal in a communication system, the method comprising:
selecting, by a receiver control system, a synthesis wavelet filter bank that is adaptive and capable of demodulating, pulse shaping, and decoding a transmitted signal;
receiving the transmitted signal to produce a received signal;
recursively generating, by the receiver control system, low-pass and high-pass filters according to the synthesis wavelet filter bank;
re-ordering the low-pass and high-pass filters according to frequency by the synthesis wavelet filter bank, wherein re-ordering the low-pass and high-pass filters includes:
pairing a plurality of high-pass filters and a plurality of low-pass filters to form a plurality of filter bank pairs, wherein the synthesis wavelet filter bank is in a stage of recursion;
numbering said plurality of filter bank pairs;
ordering even numbered filter bank pairs such that an even numbered input to each of the even numbered filter bank pairs are filtered with a low-pass filter, and an odd numbered input to each of the even numbered filter bank pairs are filtered with a high-pass filter; and
reordering odd numbered filter bank pairs such that an odd numbered input to each of the odd numbered filter bank pairs are filtered with a low-pass filter, and an even numbered input to each of the odd numbered filter bank pairs are filtered with a high-pass filter;
recursively filtering the received signal with the reordered low-pass and high-pass filters by the synthesis wavelet filter bank; and
decoding symbols from the recursively filtered signal by the synthesis wavelet filter bank.

6. The method of claim 5, wherein receiving the transmitted signal further comprises demodulating a carrier by the synthesis wavelet filter bank.

7. The method of claim 5 further comprising the steps of:
disaggregating the symbols to produce a decoded binary data stream.

8. The method of claim 5, wherein the recursively filtering step further comprises:
filtering the received signal with the low-pass and high-pass filters in a first stage of recursion to produce recursively filtered signals comprising a low-pass and a high-pass filtered signals; and
filtering in a second stage the low-pass and high-pass filtered signals with the low-pass and high-pass filters;
filtering in a third stage the low-pass and high-pass filtered signals with the low-pass and high-pass filters; and
filtering in a fourth stage the low-pass and high-pass filtered signals with the low-pass and high-pass filters.

9. The method of claim 5, wherein numbering said plurality of filter bank pairs includes numbering inputs to each of the plurality of filter bank pairs.

10. The method of claim 5, further comprising adding delay to inputs to each of the plurality of filter bank pairs wherein the synthesis wavelet filter bank is in a stage of recursion.

11. A method for encoding, pulse-shaping, and modulating transmitted signal values in a communication system, the method comprising:
selecting, by a transmitter control system, an analysis wavelet filter bank that is adaptive and capable of encoding, pulse shaping, and modulating a signal on the transmitter side;
recursively generating, by the transmitter control system, low-pass and high-pass filters in a plurality of stages according to the analysis wavelet filter bank;
re-ordering the low-pass and high-pass filters within at least two of the plurality of stages according to frequency, wherein re-ordering the low-pass and high-pass filters includes:
pairing a plurality of high-pass filters and a plurality of low-pass filters to form a plurality of filter bank pairs, wherein the analysis wavelet filter bank is in a stage of recursion;
numbering said plurality of filter bank pairs;
ordering even numbered filter bank pairs such that an even numbered input to each of the even numbered filter bank pairs are filtered with a low-pass filter, and an odd numbered input to each of the even numbered filter bank pairs are filtered with a high-pass filter; and
reordering odd numbered filter bank pairs such that an odd numbered input to each of the odd numbered filter bank pairs are filtered with a low-pass filter, and an even numbered input to each of the odd numbered filter bank pairs are filtered with a high-pass filter;
selecting values from the signal by the analysis wavelet filter bank;
using the selected values for modulating low-pass and high-pass filters; and
combining the modulated low-pass and high-pass filters to output an encoded signal.

12. The method of claim 11 further comprising the steps of:
aggregating an encoded binary data stream into a plurality of symbols having an unequal number of bits per symbol depending upon a channel quality; and
creating the encoded signal from the plurality of symbols.

13. The method of claim 11 further comprising the step of:
transmitting the encoded signal from the combined low-pass and high-pass filters in base band.

* * * * *

UNITED STATES PATENT AND TRADEMARK OFFICE
CERTIFICATE OF CORRECTION

| | | |
|---|---|---|
| PATENT NO. | : 7,787,545 B2 | |
| APPLICATION NO. | : 10/756197 | |
| DATED | : August 31, 2010 | |
| INVENTOR(S) | : Orr et al. | |

It is certified that error appears in the above-identified patent and that said Letters Patent is hereby corrected as shown below:

On the Title page, Item (75), Inventors: "Longiven, TX (US)" should read --Longview, TX (US)--

On the Title page, Item (73), Assignee: "XtendWave, Inc., Dallas, TX (US)" should read --XW, LLC, Allen Park, MI (US)--

Signed and Sealed this
Twenty-fifth Day of January, 2011

David J. Kappos
*Director of the United States Patent and Trademark Office*